US012586121B2

(12) United States Patent
Ishijima et al.

(10) Patent No.: US 12,586,121 B2
(45) Date of Patent: Mar. 24, 2026

(54) INFORMATION PROCESSING APPARATUS FOR ORDERING VEHICLE PARTS

(71) Applicant: TOYOTA JIDOSHA KABUSHIKI KAISHA, Toyota (JP)

(72) Inventors: Yoshito Ishijima, Nagoya (JP); Yu Hamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 181 days.

(21) Appl. No.: 18/492,997

(22) Filed: Oct. 24, 2023

(65) Prior Publication Data

US 2024/0135428 A1    Apr. 25, 2024
US 2024/0232987 A9    Jul. 11, 2024

(30) Foreign Application Priority Data

Oct. 25, 2022    (JP) ................................. 2022-170616

(51) Int. Cl.
*G06Q 30/00*        (2023.01)
*G06Q 30/0601*      (2023.01)
(52) U.S. Cl.
CPC ................................ *G06Q 30/0633* (2013.01)
(58) Field of Classification Search
CPC .... G06Q 30/00; G06Q 30/06; G06Q 30/0601; G06Q 30/0623; G06Q 30/0625
See application file for complete search history.

(56) References Cited

U.S. PATENT DOCUMENTS

| | | | | | |
|---|---|---|---|---|---|
| 2009/0063172 A1* | 3/2009 | Thomas | ................. | G06Q 10/06 | |
| | | | | 705/303 | |
| 2010/0314456 A1* | 12/2010 | Hartwig | ............ | H04M 1/72412 | |
| | | | | 235/487 | |
| 2015/0066674 A1* | 3/2015 | Liu | ..................... | G06Q 30/0601 | |
| | | | | 705/26.1 | |
| 2015/0142535 A1* | 5/2015 | Payne | ................ | G06Q 30/0633 | |
| | | | | 705/14.4 | |
| 2016/0078403 A1* | 3/2016 | Sethi | ................. | G06Q 10/0875 | |
| | | | | 705/26.81 | |
| 2016/0189115 A1* | 6/2016 | Cattone | ................ | G06Q 10/087 | |
| | | | | 705/26.8 | |

(Continued)

FOREIGN PATENT DOCUMENTS

| | | |
|---|---|---|
| JP | 2002015178 | 1/2002 |
| JP | 2004-287976 A | 10/2004 |
| JP | 2008-250519 A | 10/2008 |

OTHER PUBLICATIONS

Keong, Ho Kai. Automotive Evaluation Complementary Tool for Recoverability and Reusability. MS thesis. University of Malaya (Malaysia), 2018. (Year: 2018).*

(Continued)

*Primary Examiner* — Christopher B Seibert
(74) *Attorney, Agent, or Firm* — Dinsmore & Shohl LLP

(57) ABSTRACT

The information processing apparatus manages a first site for accepting an order for a part for a vehicle. In the information processing apparatus, the controller obtains a first identification information that uniquely identifies the first vehicle. The controller specifies a first part that can be attached to the first vehicle based on the obtained the first identification information. The controller posts a parts list that can identify the first part on the first site.

3 Claims, 6 Drawing Sheets

(56) References Cited

U.S. PATENT DOCUMENTS

| | | | |
|---|---|---|---|
| 2016/0189116 A1* | 6/2016 | Cattone | G06Q 30/0643 |
| | | | 705/27.2 |
| 2017/0267192 A1* | 9/2017 | Chen | G07C 5/085 |
| 2018/0047107 A1* | 2/2018 | Perl | G06N 5/02 |
| 2020/0143606 A1* | 5/2020 | Hoffmann | G07C 5/0816 |
| 2020/0346598 A1* | 11/2020 | Boston | G06F 8/65 |
| 2020/0387949 A1* | 12/2020 | Patel | G06Q 30/0631 |
| 2022/0188407 A1* | 6/2022 | Lim | G06F 21/54 |
| 2022/0306050 A1* | 9/2022 | Rich | B60S 5/00 |
| 2022/0343392 A1* | 10/2022 | Yokoyama | G08G 1/207 |
| 2023/0025611 A1* | 1/2023 | Endo | G07C 5/008 |

OTHER PUBLICATIONS

Haseeb, A. S. M. A., et al. "Compatibility of automotive materials in biodiesel: A review." Fuel 90.3 (2011): 922-931. (Year: 2011).*

* cited by examiner

[Fig. 1]
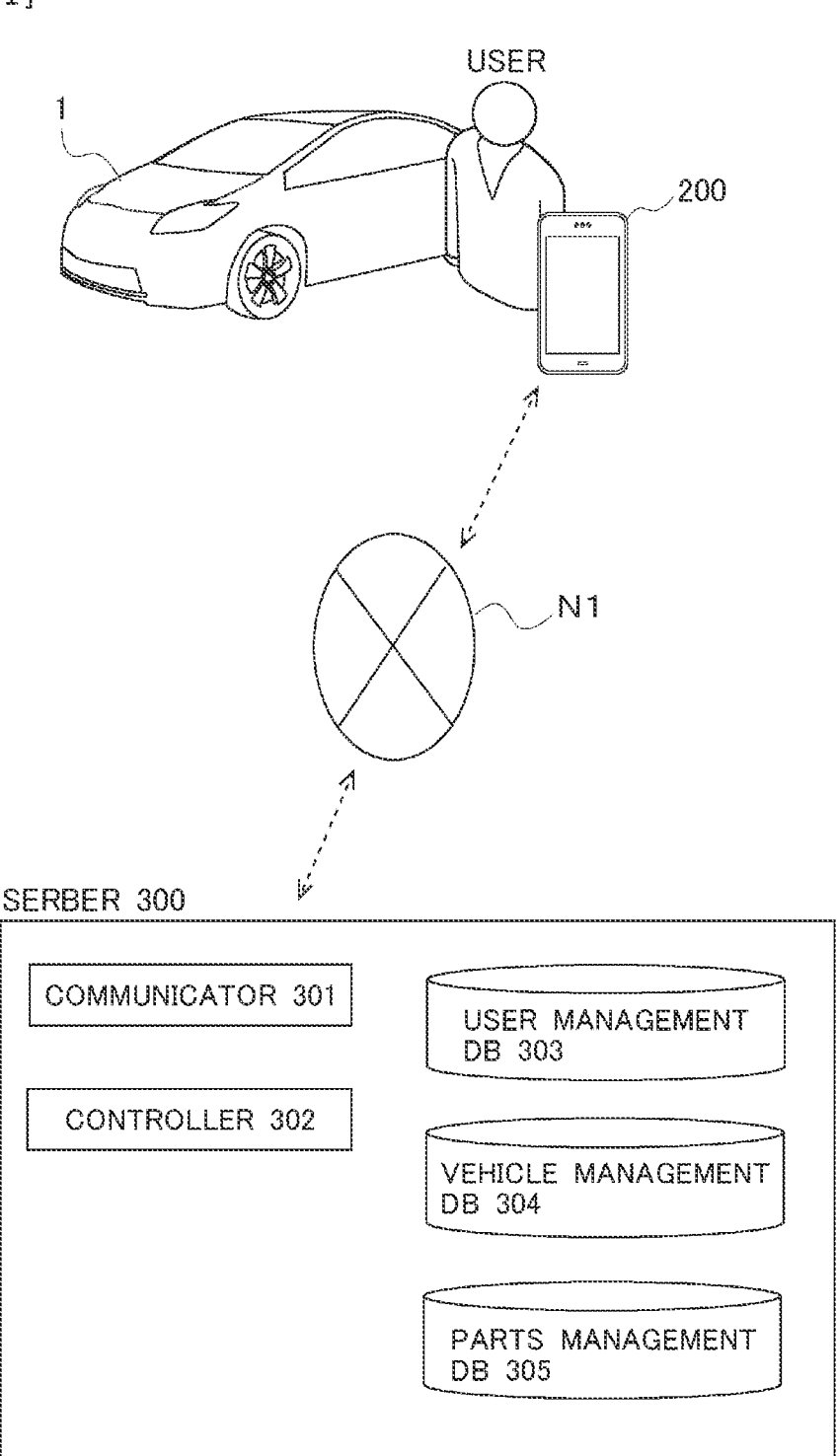

[Fig. 2]
FIRST WEB PAGE
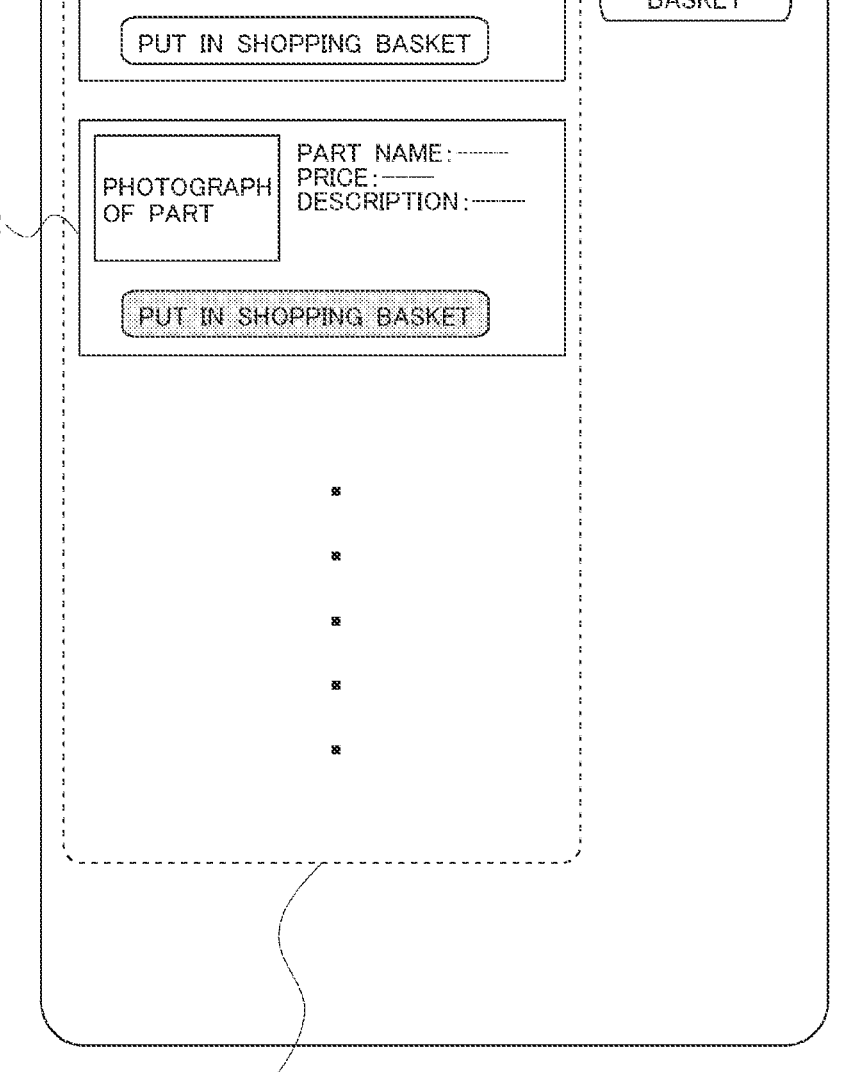
PART NAME:——
PRICE:——
DESCRIPTION:——
PHOTOGRAPH OF PART
D11
PUT IN SHOPPING BASKET
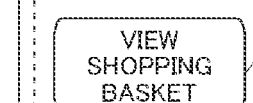
VIEW SHOPPING BASKET
D2
PART NAME:——
PRICE:——
DESCRIPTION:——
PHOTOGRAPH OF PART
D12
PUT IN SHOPPING BASKET
D1

[Fig. 3]
SECOND WEB PAGE
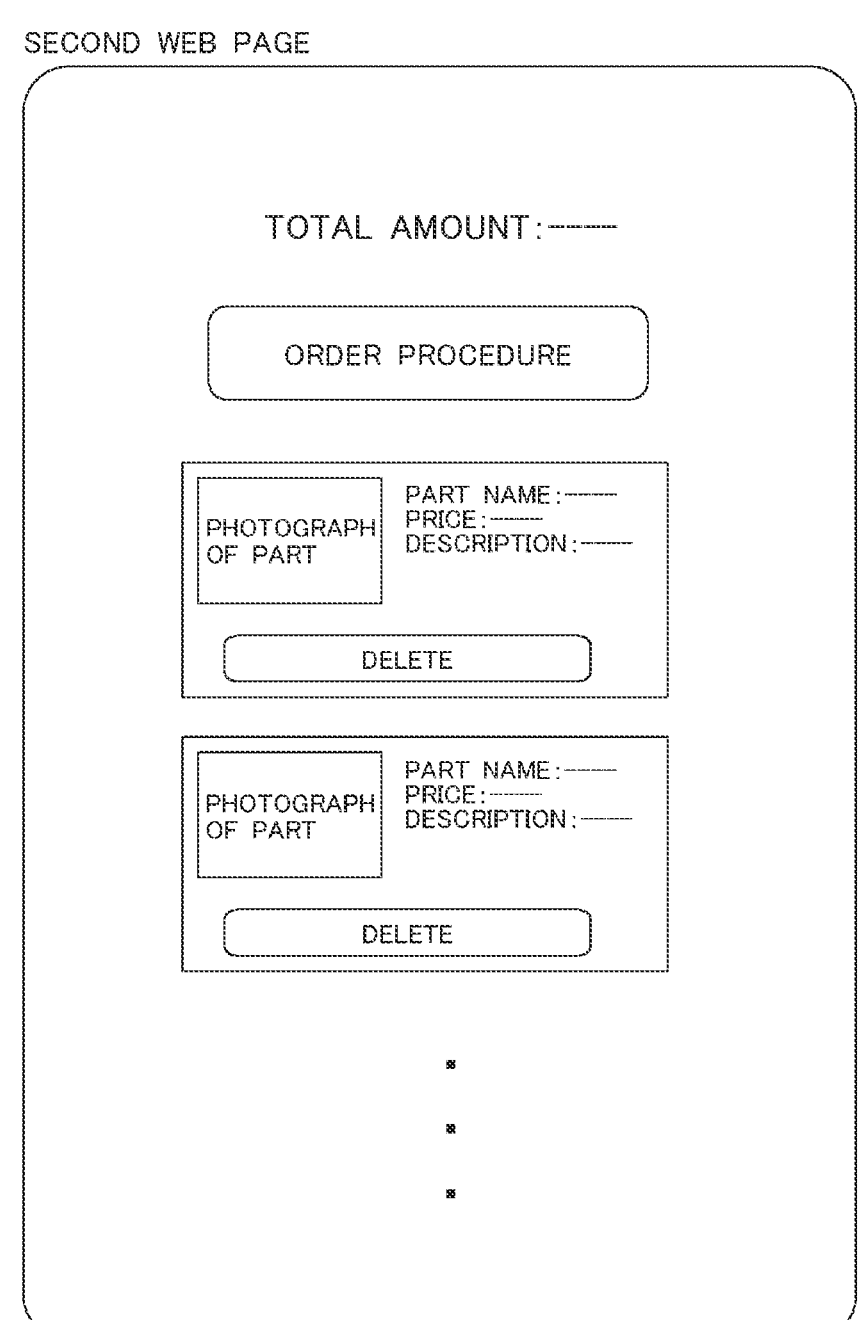

[Fig. 4]

VEHICLE MANAGEMENT DB 304

| VEHICLE ID | LPART ID | ATTACHEMENT AVAILABILITY | HISTORY | |
|---|---|---|---|---|
| V00001 | P00001 | POSSIBLE | P00100 | RECORD |
| | P00002 | IMPOSSIBLE | | |
| | ⋮ | ⋮ | | |
| V00002 | P00001 | IMPOSSIBLE | NONE | RECORD |
| | P00002 | POSSIBLE | | |
| | ⋮ | ⋮ | | |
| ⋮ | ⋮ | ⋮ | | |

[Fig. 5]
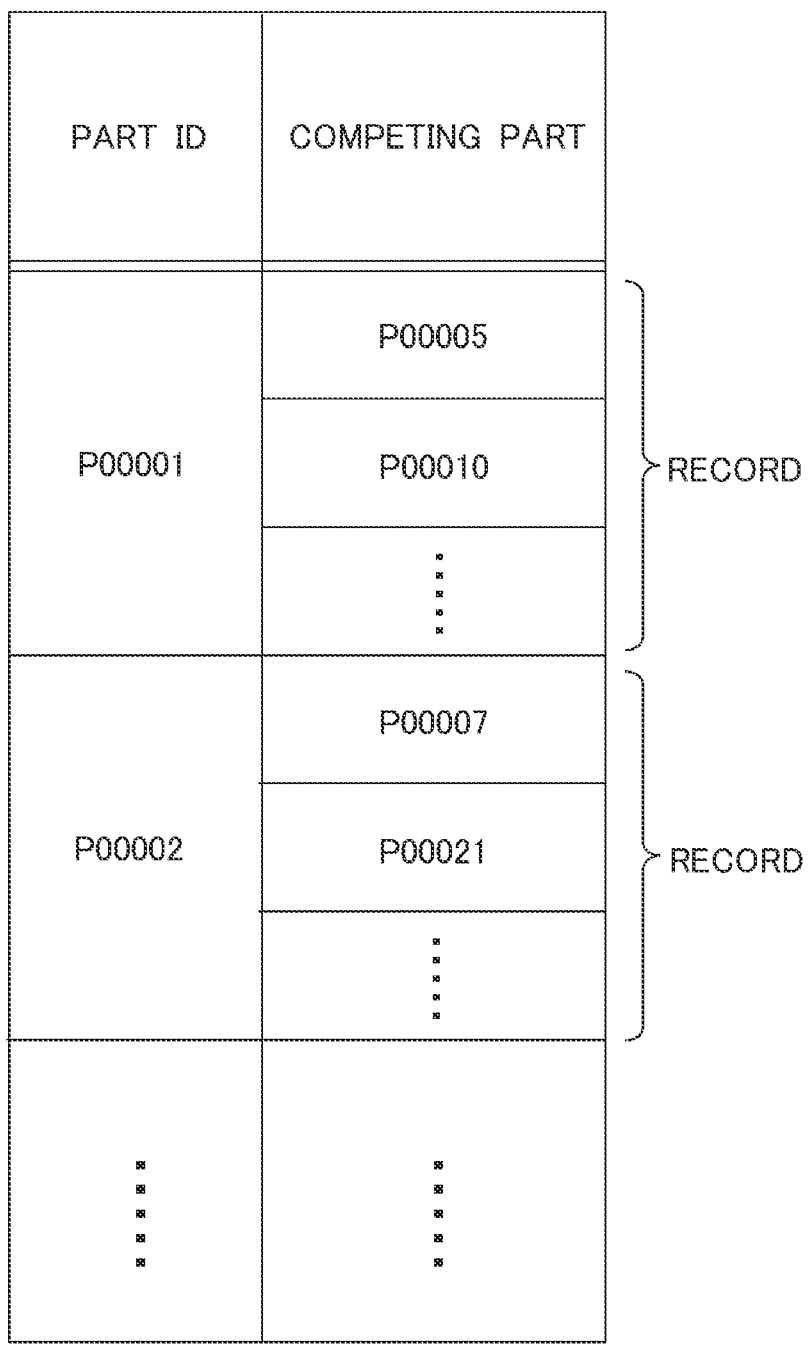
PARTS MANAGEMENT DB 305

[Fig. 6]
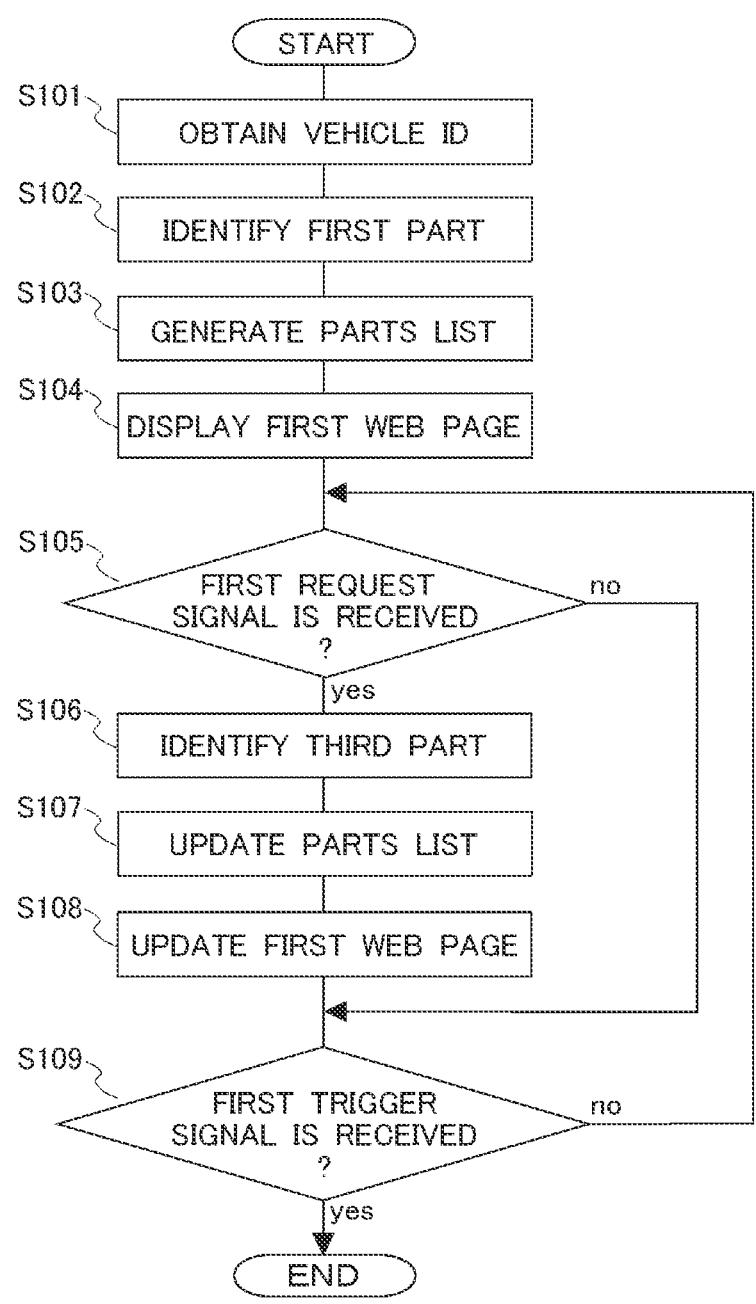

INFORMATION PROCESSING APPARATUS FOR ORDERING VEHICLE PARTS

CROSS REFERENCE TO THE RELATED APPLICATION

This application claims the benefit of Japanese Patent Application No. 2022-170616, filed on Oct. 25, 2022, which is hereby incorporated by reference herein in its entirety.

BACKGROUND

Technical Field

The present disclosure relates to an information processing apparatus.

Description of the Related Art

A commodity trading system for ordering a commodity by a user via a network is known (see, for example, Patent Literature 1).

Citation List

Patent Literature

Patent Literature 1: Japanese Patent Application Laid-Open No. 2002-015178

SUMMARY

An object of the present disclosure is to provide a technology that can improve convenience when a user orders parts for a vehicle.

The present disclosure is an information processing apparatus that manages a first site for accepting an order for parts for a vehicle. For example, the information processing apparatus may comprise a controller including at least one processor, and the controller configured to excute processing of:

obtaining a first identification information that uniquely identifies a first vehicle;

identifying a first part that can be attached to the first vehicle without competing with parts already installed on the first vehicle, based on the first identification information; and posting a parts list in which the first part can be identified on the first site.

The present disclosure can also be regarded as an information processing method in which a computer executes the processing of the information processing apparatus. Further, the present disclosure can also be regarded as a program for causing a computer to execute the information processing method described above, or as a non-transitory storage medium for storing the program.

According to the present disclosure, it is possible to provide a technology that can improve convenience when a user orders a part for a vehicle.

BRIEF DESCRIPTION OF THE DRAWINGS

FIG. 1 is a block diagram schematically illustrating a configuration example of a system to which the information processing apparatus according to the present disclosure is applied.

FIG. 2 is a diagram illustrating an example of a first web page according to an embodiment.

FIG. 3 is a diagram illustrating an example of a second web page according to the embodiment.

FIG. 4 illustrates an example of information stored in the vehicle management DB according to the embodiment.

FIG. 5 illustrates an example of information stored in a parts management DB according to the embodiment.

FIG. 6 is a flowchart illustrating an example of a processing routine executed by a server according to the embodiment.

DESCRIPTION OF THE EMBODIMENTS

The information processing apparatus according to the present disclosure is a computer that manages a first site for accepting an order for a part for a vehicle. The "vehicle parts" referred to herein are not limited to hardware such as exterior parts and interior parts of the vehicle, but also include software for upgrading the traveling function and safety function of the vehicle. In the information processing apparatus, the controller obtains a first identification information of a first vehicle. The first vehicle is a vehicle for which the user has ownership or usage rights. The first identification information is an information for uniquely identifying the first vehicle, and is, for example, a VIN (Vehicle Identification Number) or a vehicle body number. The first identification information is not limited to the VIN and the vehicle body number, and may be an information that can specify a part (first part) that can be attached to the first vehicle without competing with parts already attached to the first vehicle. The obtaining of the first identification information may be performed by causing a user who browses the first site input. Further, an authentication information (for example, user ID) when the user logs in to the first site and the first identification information may be linked in advance, and the controller may obtain the first identification information using the user ID as an argument.

Based on the obtained first identification information, the controller specifies a first part that can be attached to the first vehicle without competing with parts already attached to the first vehicle. The "first part" referred to herein is, for example, a part that conforms to a vehicle type of the first vehicle, and is a part that does not compete with parts already installed in the first vehicle in terms of function, installation location, etc. That is, the "first part" is a part that can be attached to the first vehicle without taking measures such as changing the function of parts installed in the first vehicle and/or removing those. The identification of the first part as described above may be performed based on the first identification information and an information stored in a database. The "database" referred to here may be, for example, to store attachment availability information for each part in association with the first identification information. The "attachment availability information" is, for example, an information indicating whether it can be attached or cannot be attached without competing with the parts already installed in the first vehicle. The parts subject to the attachment availability information may be all the parts handled at the first site, or only the parts handled at the first site that conform to the vehicle type of the first vehicle may be used.

The controller posts a parts list that can identify the identified first part on the first site. The "parts list" referred to herein is, for example, a list in which the user can identify the first part and other parts (parts that cannot be attached to the first vehicle). The parts list may be a list including only the first parts. The posting of the parts list may be performed by displaying a web page on which the parts lists is posted through a browser of a terminal used by the user.

According to the present disclosure, it is possible for a user of the first vehicle to identify a part that can be attached without conflict with the parts already installed in the first vehicle. As a result, it is possible to save the user the trouble of examining parts that can be attached to the first vehicle without competing with the parts already installed in the first vehicle. Further, according to the present disclosure, it is possible to suppress the user from ordering a part that cannot be attached to the first vehicle. Therefore, it is possible to improve convenience when the user places an order for a part for a vehicle.

One of the other aspects of the present disclosure can also be specified as an information processing method in which a computer executes the processing of the information processing apparatus. According to such the information processing method, the same operation and advantageous effects as those of the information processing apparatus can be obtained. Another aspect of the present disclosure may be a program for causing a computer to execute the processing of the information processing apparatus, or a non-transitory storage medium for storing the program.

In the following, specific embodiments of the technology disclosed herein will be described with reference to the drawings. It should be understood that hardware configurations, module configurations, and functional configurations that will be described in the following description of the embodiments are not intended to limit the technical scope of the present disclosure only to them, unless otherwise stated.

Embodiment

A embodiment of the present disclosure herein will be described with reference to FIGS. 1 through 6. In the following description of the embodiment, an example of applying the information processing apparatus according to the present disclosure to a system for receiving and ordering parts for a vehicle online will be described.

(General Configuration of System)

FIG. 1 is a block diagram schematically illustrating an example of a configuration of a system according to the present embodiment. The system according to the present embodiment includes a user terminal 200 and a server 300. Although only one user terminal 200 is indicate in FIG. 1, a plurality of user terminals 200 may be included.

The user terminal 200 is a terminal used by a user who has ownership or right to use the first vehicle 1. The user terminal 200 in the present embodiment is a computer on which a browser application program is installed, such as a smartphone, a mobile phone, a tablet terminal, a wearable device, or a personal computer.

The server 300 is an information processing apparatus that manages a first site for accepting an order for parts for a vehicle. The server 300 can be configured as a computer having a processor such as a CPU or GPU, a main memory such as RAM and ROM, and an auxiliary memory such as an EPROM, a hard disk drive, or removable media. An operating system (OS), various programs, various tables, and the like are stored in the auxiliary memory of the server 300. The processor of the server 300 loads the program stored in the auxiliary memory into the work area of the main memory and executes it, thereby realizing each function that matches a predetermined purpose as described later. Note that some or all functions of the server 300 may be realized by a hardware circuit such as an ASIC (Application Specific Integrated Circuit) or an FPGA (Field Programmable Gate Array).

The server 300 in the present embodiment is configured to be able to execute a web server for performing an interaction with the user terminal 200. When the user logs in to the site provided by the web server (the first site) through the browser of the user terminal 200, the server 300 displays the web page of the first site (the web page on which the information of the parts for the vehicle is posted) through the browser of the user terminal 200. The server 300 accepts an order request for parts posted on the web page from the user terminal 200. The server 300 performs an order processing for the corresponding parts. The server 300 may provide the above service by means other than the Web server. For example, the server 300 may execute a service that interacts with the user terminal 200 using a dedicated application program installed on the user terminal 200 and a predetermined protocol. The parts handled at the first site are not limited to hardware such as exterior parts and interior parts of the vehicle, but also include software for upgrading a traveling function and/or a safety function of the vehicle.

As illustrated in FIG. 1, the server 300 in the present embodiment includes a communicator 301, a controller 302, a user management DB303, a vehicle management DB304, a parts management DB305, and the like.

The communicator 301 is a communication interface for connecting the server 300 to the network N1. The communicator 301 connects, for example, to the network N1 via LAN or Wi-Fi (registered trademark) and communicates with the user terminal 200 via the network N1. The network N1 is, for example, a WAN which is a world-wide public communication network such as the Internet, or other communication network.

The controller 302 is a software module realized by executing a program stored in the auxiliary memory by the processor of the server 300. The controller 302 obtains a vehicle ID of the first vehicle 1 by triggering that the user logs in to the first site through a browser of the user terminal 200. The vehicle ID is information for uniquely identifying an individual of the first vehicle 1, and corresponds to the "first identification information" according to the present disclosure. The vehicle ID may be a VIN or a vehicle body number. The obtaining of the vehicle ID is performed based on the user ID of the user and an information stored in the user management DB 303 described later. The user ID is information for individually identifying a plurality of users who use the first site, and may be information used as a login ID when each user logs in to the Web server (first site). For example, the user ID may be set when each user registers as a member of the first site.

The controller 302 identifies the first part based on the vehicle ID and an information stored in the vehicle management DB 304 described later. The first part is a part that can be attached to the first vehicle 1 among the parts handled at the first site. The "parts that can be attached to the first vehicle 1" is a part that conforms to the vehicle type of the first vehicle 1 and does not conflict with the parts already installed in the first vehicle 1 in function or installation location. It is a part. That is, the "parts that can be attached to the first vehicle 1" is a part that conforms to the vehicle type of the first vehicle 1, and is a part that can be attached without taking measures such as changing the function of parts already installed in the first vehicle and/or removing those. Therefore, parts that are the same as the parts already installed in the first vehicle 1 and parts that compete with the parts already installed in the first vehicle 1 are excluded from a target of the first part. Such a first part may include a plurality of types of parts. Note that the "part already installed in the first vehicle 1" includes, for example, a part installed at the time of manufacture of the first vehicle 1, at the time of sale of the first vehicle 1, or at the time of commencement of lease of the first vehicle 1, as well as a part ordered in the past at the first site (corresponding to the "fourth part" according to the present disclosure).

The controller 302 generates a parts list based on the identified first parts. The controller 302 displays a web page (hereinafter, sometimes referred to as the "first web page") on which the generated parts list is posted through a browser of the user terminal 200. The parts list in the present embodiment is a list of parts handled at the first site, and is a list that can identify the first part. Specifically, the parts list is a list in which the first parts are displayed in an orderable form and the parts that cannot be attached to the first vehicle 1 (corresponding to the "second parts" according to the present disclosure) are displayed in an non-orderable form. The second part includes a part that does not conform to the vehicle type of the first vehicle 1, and a part that conforms to the vehicle type of the first vehicle 1 but compete with parts already installed in the first vehicle 1.

FIG. 2 is a diagram illustrating an example of the first web page. In the example indicate FIG. 2, the parts list D1 and the "view shopping basket" button D2 are displayed on the first web page. The parts list D1 includes a display area D11-D12 for each part. The display area D11-D12 of each part includes a photograph of the part, a name of the part (part name), a description of the part, a button to "put in a shopping basket", and the like. In the present embodiment, among the parts included in the parts list, the "put in shopping basket" button is displayed in a selectable form for the parts corresponding to the first part (D11 in FIG. 2). In addition, among the parts included in the parts list, the "put in the shopping basket" button is displayed in a non-selectable form (grayed out) for the parts corresponding to the second part (D12 in FIG. 2).

When the user browsing the first web page inputs an operation of selecting the "put in shopping basket" button in the display area of the part corresponding to the first part (for example, D11 in FIG. 2) to the user terminal 200, a request signal for putting the corresponding part in the shopping basket (hereinafter referred to as "first request signal") is transmitted from the user terminal 200 to the server 300. When the first request signal is received by the communicator 301 of the server 300, the controller 302 stores the identification information (part ID) of the corresponding part in the shopping cart. The shopping basket is a function in which the user holds the part ID of the part to be ordered, and is an example of the "order scheduled list" according to the present disclosure.

When the user browsing the first web page inputs an operation of selecting the "view shopping basket" button D2 to the user terminal 200, a request signal for viewing the shopping basket (hereinafter referred to as "second request signal") is transmitted from the user terminal 200 to the server 300. When the second request signal is received by the communicator 301 of the server 300, the controller 302 displays the web page of the shopping basket (hereinafter, sometimes referred to as the "second web page") through the browser of the user terminal 200.

FIG. 3 is a diagram illustrating an example of a second web page. In the example indicate FIG. 3, the second web page includes a total amount of parts held in the shopping basket, an "order procedure" button, a list of parts held in the shopping basket, and the like. The list of parts held in the shopping basket includes a "delete" button to remove each part from the shopping basket. When the user browsing the second web page inputs an operation of selecting the "order procedure" button to the user terminal 200, a request signal for requesting an order for parts held in the shopping basket (hereinafter referred to as the "third request signal") is transmitted from the user terminal 200 to the server 300. When the third request signal is received by the communicator 301 of the server 300, the controller 302 executes settlement processing and ordering processing of the parts held in the shopping cart. Since known techniques can be used for settlement processing and ordering processing, explanations will be omitted.

Returning now to the description of FIG. 1, the controller 302 updates the parts list displayed on the first web page when the first request signal is received (when the parts are put in the shopping cart). Specifically, among the first parts included in the parts list before receiving the first request signal, the controller 302 excludes the parts (corresponding to the "third parts" according to the present disclosure) and the parts competing with the third parts from a target of the first parts. That is, among the first parts included in the parts list before receiving the first request signal, the controller 302 generates a new parts list in which the attributes of the third parts and the parts competing with the third parts are changed from the first parts to the second parts. The controller 302 displays the generated new parts list on the first web page. The part competing with the third part is a part that competes with the third part in terms of function, installation location, etc. (a part that cannot be attached to the first vehicle 1 without taking measures such as changing function of the third part or removing the third part). Note that the controller 302 identifies a part that compete with the third part based on an information stored in the parts management DB 305 described later.

Each of the user management DB 303, the vehicle management DB 304, and the parts management DB 305 is a relational database constructed in the auxiliary memory of the server 300. Each of the user management DB 303, the vehicle management DB 304, and the parts management DB 305 is realized by, for example, a processor of the server 300 executing a program of the DBMS.

The user management DB 303 stores an information associated with the user and the first vehicle 1. Specifically, the user management DB 303 stores an information that associates the user ID of each user with the vehicle ID of the first vehicle 1 to which each user has ownership or use rights.

The vehicle management DB 304 stores an information that associates the attachment availability information with the first vehicle 1 for each part handled at the first site. FIG. 4 illustrates an example of information stored in the vehicle management DB 304. As indicate FIG. 4, the vehicle management DB 304 in the present embodiment has a record for each vehicle (hereinafter, it may be referred to as a "vehicle information record"). As indicate FIG. 4, each vehicle information record has fields such as a vehicle ID, a part ID, an attachment availability, and a history. The configuration of the vehicle information record is not limited to the example illustrated in FIG. 4, and fields can be added, changed, and deleted as appropriate.

The vehicle ID of the first vehicle 1 is registered in the vehicle ID field of the vehicle information record. In the part ID field, the part ID of each of the plurality of parts handled at the first site are registered. In the attachment availability field, an information indicating whether each part registered in the part ID field can be attached to the first vehicle 1

(attachment availability information) is registered. For example, regarding a part that can be attached to the first vehicle 1, "possible" is registered in the attachment availability field. On other hand, regarding a part that cannot be attached to the first vehicle 1, "impossible" is registered in the attachment availability field. The information registered in the attachment availability field is set based on the parts already attached to the first vehicle 1. The information on the parts already attached to the first vehicle 1 may be provided, for example, to the operator of the first site from the manufacturer of the first vehicle 1, the dealer of the first vehicle 1, or the leaser of the first vehicle 1. In the history field, the part ID of a part ordered in the past by the user of the first vehicle 1 at the first site is registered. If there is no part that the user of the first vehicle 1 has ordered in the past on the first site, "None" is registered in the history field.

Returning now to the description in FIG. 1, the parts management DB 305 stores information associating each part handled at the first site with a competing part in each part. FIG. 5 illustrates an example of information stored in the parts management DB 305. As indicate FIG. 5, the parts management DB 305 in the present embodiment has a record corresponding to each of a plurality of parts handled at the first site (hereinafter, it may be referred to as a "part information record"). As indicate FIG. 5, each part information record has each field such as a part ID and a competing part. The configuration of the component information record is not limited to the example illustrated in FIG. 5, and fields can be added, changed, and deleted as appropriate.

In the part ID field of the part information record, the part ID of the part handled at the first site is registered. In the competing part field, a part ID of a part that competes with the part registered in the part ID field among the parts handled at the first site is registered.

Note that any of the components of the server 300 or a part of the processing thereof may be executed by another computer connected to the network N1. Further, the configuration of the server 300 is not limited to the example illustrated in FIG. 1, and the components can be omitted, changed, or added as appropriate.
(Process Executed in Server)

Next, the flow of processing performed by the server 300 in the present embodiment will be described based on FIG. 6. FIG. 6 is a flowchart illustrating a processing routine executed by the server 300 triggered by the user logging in to the first site.

In FIG. 6, when the user logs in to the first site through the browser of the user terminal 200, the controller 302 of the server 300 accesses the user management DB 303 using the user's login ID (user ID) as an argument, and obtains the vehicle ID of the first vehicle 1 (step S101). When the process of step S101 is completed, the controller 302 executes the process of step S102.

In step S102, the controller 302 accesses the vehicle management DB 304 using the vehicle ID obtained in step S101 as an argument, and identifies a vehicle information record in which information matching the vehicle ID is registered in the vehicle ID field. The controller 302 extracts a part in which "possible" is registered in the attachment availability field in the specified record as a candidate for the first part. The controller 302 determines whether the part ID (the part ID of the fourth part) is registered in the history field of the identified vehicle information record. When "None" is registered in the above history field, the controller 302 identifies all of the candidates for the first part as the first part. On the other hand, when the part ID (part ID of the fourth part) is registered in the history field described above, the controller 302 accesses the parts management DB 305 using the part ID (part ID of the fourth part) registered in the history field as an argument, and identifies the part information record in which information matching the part ID is registered in the part ID field. The controller 302 extracts a part ID (part ID of a part that competes with the fourth part) registered in the competing part field of the identified part information record. The controller 302 identifies, as the first part, a candidate that excludes the fourth part and the part that competes with the fourth part among the candidates for the first part. When the process of step S102 is completed, the controller 302 executes the process of step S103.

In step S103, the controller 302 generates a parts list based on the first parts identified in step S102. As described above, the parts list is a list in which the first part is displayed in an orderable form and the second part is displayed in a non-orderable form among the parts handled at the first site. When the process of step S103 is completed, the controller 302 executes the process of step S104.

In step S104, the controller 302 causes the browser of the user terminal 200 to display the first web page including the parts list generated in step S103. In the first web page, as exemplified in the FIG. 2, among the parts included in the parts list, the "put in shopping basket" button is displayed in a selectable form for the parts corresponding to the first part (D11 in FIG. 2), and the "put in shopping basket" button is displayed in a non-selectable form for the parts corresponding to the second part (D12 in FIG. 2). When the process of step S104 is completed, the controller 302 executes the process of step S105.

In step S105, the controller 302 determines whether the communicator 301 of the server 300 has received the first request signal. As described above, the first request signal is a signal transmitted from the user terminal 200 to the server 300 when an operation for selecting a "put in shopping basket" button for the first part is input to the user terminal 200. In case where the communicator 301 of the server 300 receives the first request signal (positive determination in step S105), the controller 302 executes the process of step S106.

In step S106, the control unit 302 identifies the third part (the part to be ordered by the user) based on the part ID held in the shopping cart. When the process of step S106 is completed, the controller 302 executes the process of step S107.

In step S107, the controller 302 accesses the parts management DB DB305 using the part ID of the third part identified in step S106 as an argument, and identifies the part information record in which information matching the part ID of the third part is registered in the part ID field. The controller 302 identifies a part (a part that compete with the third part) registered in the competing part field of the identified part information record. The controller 302 updates the parts list by changing the attributes of the third part and the parts competing with the third part from the first part to the second part among the parts included in the parts list generated in step S103. When the process of step S107 is completed, the controller 302 executes the process of step S108.

In step S108, the controller 302 updates the first web page by changing the parts list displayed on the first web page to the parts list updated in step S107. In the updated first web page, the "put in shopping basket" button is displayed in a non-selectable form for the third part and the parts competing with the third part among the first parts identified in step S102. When the process of step S108 is completed, the controller 302 executes the process of step S109.

Here, in case where the communicator 301 of the server 300 does not receive the first request signal in step S105 (negative determination in step S105), the controller 302 skips the processes of steps S106-S108 and executes the process of step S109.

In step S109, the controller 302 determines whether the communicator 301 of the server 300 has received a first trigger signal. The first trigger signal is a signal that triggers the display of the first web page to end. The first trigger signal may be, for example, a second request signal or a signal requesting a user to log out. In case where the communicator 301 of the server 300 has not received the first trigger signal (negative determination in step S109), the controller 302 re-executes the processing from step S105 onwards. On the other hand, in case where the communicator 301 of the server 300 receives the first trigger signal (positive determination in step S109), the controller 302 ends execution of the present processing routine.

According to the above-described embodiment, among the parts handled at the first site, parts already installed in the first vehicle 1 (parts installed at the time of manufacture of the first vehicle 1, parts installed at the time of sale of the first vehicle 1, parts installed at the time of lease of the first vehicle 1, and parts ordered in the past at the first site (fourth parts)), parts that compete with parts already installed in the first vehicle 1, parts held in a shopping basket (ordering schedule list) (third parts), and parts that compete with the third parts are excluded from the target of the first parts. Further, in the first web page, only the parts corresponding to the first part among the parts handled at the first site are displayed in a form in which an order can be placed.

Therefore, by viewing the parts list of the first web page, the user of the first vehicle 1 can identify a part that can be attached to the first vehicle 1 without competing with the part already installed in the first vehicle 1. Thus, it is possible to save the user the trouble of examining a part that can be attached to the first vehicle 1 without competing with the part already installed in the first vehicle 1. In addition, it is possible to prevent the user from ordering the third part, the part that competes with the third part, a fourth part, the part that competes with the fourth part, and the part that can not be attached to the first vehicle 1. Therefore, it is possible to improve convenience when the user places an order for a part for a vehicle.

<Others>

The above-described embodiment is only an example, and the present disclosure may be appropriately modified and implemented within the scope of not departing from the essence. Further, the processing and configuration described in the present disclosure can be freely combined as long as there is no technical contradiction. Further, the processing described as being executed by one apparatus may be executed by a plurality of apparatuses. Further, the processing described as being executed by different apparatuses may be executed by one apparatus. In a computer system, the hardware configuration that implements each function can be flexibly changed.

The technology disclosed herein can be implemented by supplying a computer program (information processing program) or programs configured to implement the functions described in the above description of the embodiments to a computer to cause one or more processors of the computer to read out and execute the program or programs. Such a computer program or programs may be supplied to the computer by a non-transitory, computer-readable storage medium that can be connected to a system bus of the computer or through a network. The non-transitory, computer-readable storage medium is a recording medium that can store information such as data and programs electrically, magnetically, optically, mechanically, or chemically in a computer-readable manner. Examples of such a recording medium include any type of discs including magnetic discs, such as a floppy disc (registered trademark) and a hard disk drive (HDD), and optical discs, such as a CD-ROM, a DVD, and a Blu-ray disc. The non-transitory, computer-readable storage medium may also be a ROM, a RAM, an EPROM, an EEPROM, a magnetic card, a flash memory, an optical card, an SSD (Solid State Drive), or other medium.

What is claimed is:

1. An information processing apparatus for managing a first site for accepting an order for parts for a vehicle, comprising:

a user terminal; and a server having a communicator and a controller, the communicator communicates with the user terminal via a network, and the controller includes at least one processor and a memory storing a database having attachment availability information for each part in association with first identification information that uniquely identifies a first vehicle and program instructions executable by the at least one processor to:

obtain the first identification information by triggering that a user logs in to the first site through a browser of the user terminal;

identify a first part that can be attached to the first vehicle without changing a function of parts already installed on the first vehicle and without removing parts already installed on the first vehicle, based on the first identification information and information stored in the database;

post a parts list in which the first part can be identified on the first site through the browser of the user terminal;

determine whether a first request signal is transmitted from the user terminal to the server;

identify a second part included in an order schedule list for the first vehicle in response to receiving the first request signal from the terminal used by the user; and exclude a part that competes with the second part and the second part from a target of the first part.

2. The information processing apparatus according to claim 1, wherein the parts list includes a third part that cannot be attached to the first vehicle in addition to the first part, and the memory stores program instructions executable by the at least one processor to output the parts list in a form in which the first part can be ordered and the third part cannot be ordered.

3. The information processing apparatus according to claim 1, wherein the memory stores program instructions executable by the at least one processor to:

identify a fourth part ordered in the past for the first vehicle; and exclude the fourth part and a part that competes with the fourth part among the first parts from the target of the first part.

* * * * *